M. C. HENLEY.
MACHINE FOR BORING, DRILLING, DRIVING, AND WITHDRAWING SCREWS, &c.
No. 10,892. Reissued Jan. 3, 1888.
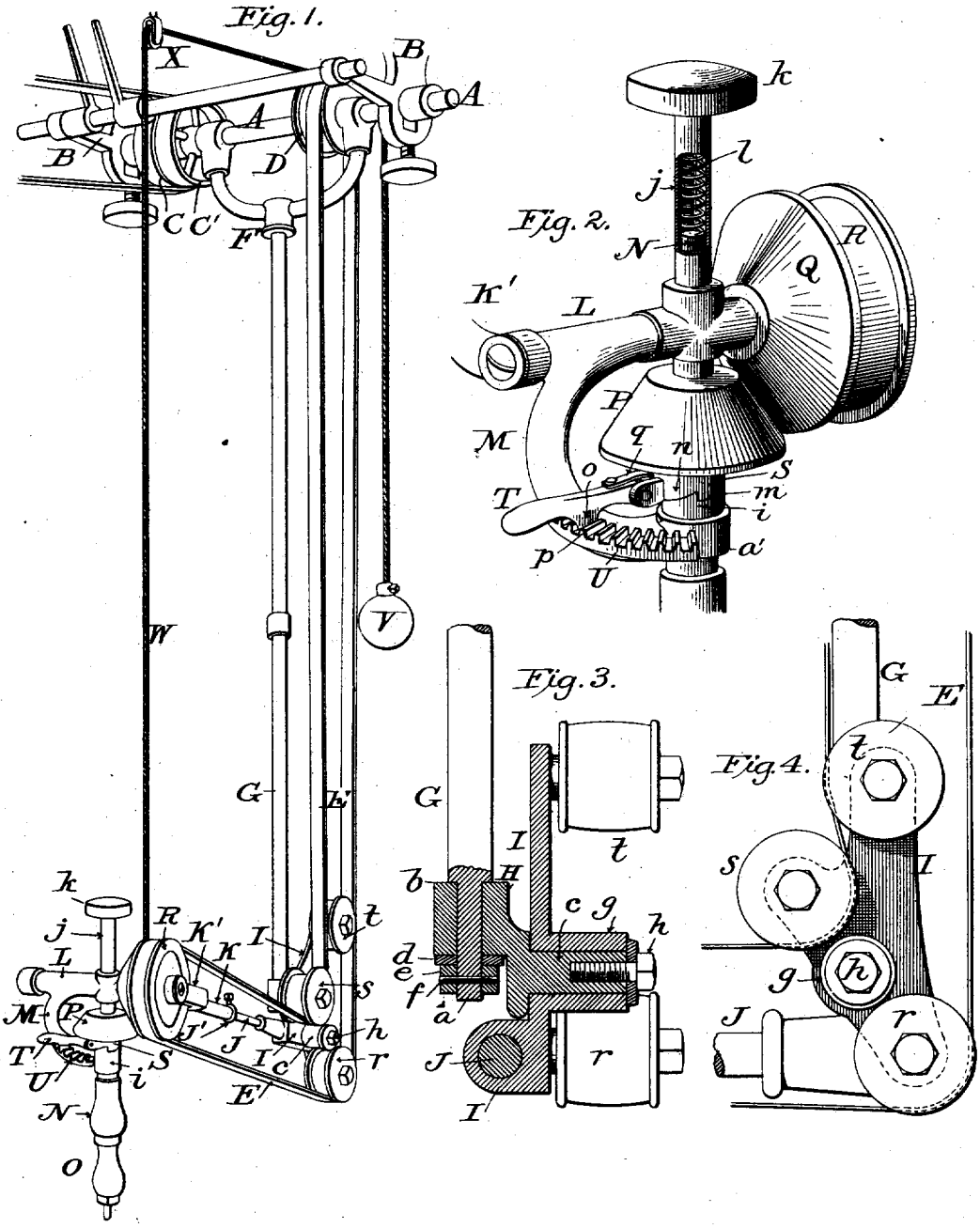
Witnesses:
James F. DuHamel
Arthur Ashley
Inventor
Micajah C. Henley,
by Dodge & Sons,
his Attys.
N. PETERS, Photo-Lithographer, Washington, D. C.

UNITED STATES PATENT OFFICE.

MICAJAH C. HENLEY, OF RICHMOND, INDIANA.

MACHINE FOR BORING, DRILLING, DRIVING, AND WITHDRAWING SCREWS, &c.

SPECIFICATION forming part of Reissued Letters Patent No. 10,892, dated January 3, 1888.

Original No. 371,195, dated October 11, 1887. Application for reissue filed December 9, 1887. Serial No. 257,461.

*To all whom it may concern:*

Be it known that I, MICAJAH C. HENLEY, of Richmond, in the county of Wayne and State of Indiana, have invented certain new and useful Improvements in Machines for Boring, Drilling, &c., of which the following is a specification.

My invention relates to power-driven mechanism for boring, drilling, driving and withdrawing screws, and performing like work; and it consists in improvements, hereinafter explained, upon the mechanism or apparatus for which Letters Patent were granted to me on the 25th day of September, 1883, numbered 285,484.

These improvements have reference more especially to the arrangement of the driving-belt, means for throwing the tool-spindle into and out of gear, and the manner of mounting the tool-carrying frame.

In the drawings, Figure 1 is a perspective view of my apparatus complete; Fig. 2, an enlarged view of the tool-stock and friction-gear, the former partly in section; Figs. 3 and 4, detail views of parts hereinafter more fully described.

The general construction and arrangement of the machine or apparatus is similar to that described in my previous patent above referred to; but by certain changes about to be described I am enabled to give the tool greater range of adjustment or movement in different directions than before and in other respects to simplify and improve the machine.

A indicates a counter-shaft carried in suitable overhead hangers, B, and provided with belt-pulleys C, C′, and D, the first of which receives a belt from any convenient source of motion, while pulley D carries a belt, E, by which motion is transmitted to the tool stock or spindle.

F indicates a yoke which is hung loosely upon the counter-shaft A and is free to swing thereon in a plane at right angles to the axis of the counter-shaft. From the yoke F a rod, G, extends downward to a convenient level for the use of the workman, and at its lower end is fashioned into a shouldered neck or stem, *a*, Fig. 3, to form a pivot or journal upon which to swivel the sleeve *b* of a block, H, which is formed with a horizontally-projecting stud, *c*. The stem or neck *a* extends through the sleeve *b*, and is furnished beneath the same with a washer, *d*, and nut *e*, the latter held by a pin, *f*, against turning off. The stud or neck *c* forms a pivot for a block or frame, I, which latter is formed with a sleeve, *g*, to fit upon the stud *c*, where it is retained by a washer and a bolt or screw, *h*, as shown in Fig. 3. By reason of this arrangement the frame I is free to rock or tip in a vertical direction, and the frame and block H are enabled to swing in a horizontal plane about the stem or neck *a*.

Secured to the tipping-frame I is a rod, J, provided with an adjustable collar, J′, and encircled by a tubular rod or sleeve, K, the inner end of which bears against said collar. The outer end of the tubular rod or sleeve K is bifurcated, as shown in Figs. 1 and 2, forming a yoke, K′, the two arms of which are connected by the cross-arm L of a tool-stock frame, M, which is loosely hung in yoke K′, and is free to swing in a vertical plane about the axis of arm L. Swiveled in a hub, *i*, of the lower arm, *a*′, of said frame is the tool stock or spindle N, furnished with a suitable chuck or tool-holder, O, which may be of any desired construction. The stock or spindle N is arranged to move longitudinally a short distance, its upper end extending into the lower end of a spring case or shell, *j*, which carries at its upper end a knob or head, *k*, to which pressure may be applied to hold the tool properly to its work, the shell *j* being secured to or carried by the tool-stock frame M, as shown in Figs. 1 and 2. A spring, *l*, within the case or shell *j*, tends to press the spindle outward. The spindle N carries a conical or beveled friction wheel or gear P, which receives motion from a like wheel or gear, Q, mounted loosely upon the cross-arm L and rigidly connected with a belt-wheel, R. The pressure of spring *l*, urging the spindle N outward, tends to keep the friction wheels or gears P Q out of contact with each other and thus to cause the tool stock or spindle to remain at rest, except when pressure is applied to the head or knob *k* sufficient to overcome the force of the spring and to give proper friction between the two wheels. The tool stock or spindle will therefore remain at rest, except when manipulated by the operator, unless the wheels or gears P Q be in some manner pressed and held together. To provide for so pressing and holding the wheels or gears together, as it is in many cases desirable to do, I form the hub or neck *i* of the lower arm of the tool-stock frame with one or more inclines, *m*, and interpose between said hub and the lower end of the hub of friction wheel or gear P a collar, S, having one or more inclines, *n*, which rest upon the inclines *m* of the stationary hub *i*. By turning the collar S and causing one set of inclines to ride upward upon the other, the collar S and the friction wheel or gear P will be lifted up and the latter pressed firmly against wheel or gear Q.

For the purpose of rotating collar S it is provided with a lever or handle, T, which is pivotally attached to the collar, so that it may rise and fall at its outer end, and said lever is formed with a tooth or lug, *o*, on its under side to engage with teeth *p*, formed upon a segmental plate or arm, U, cast with or attached to the tool-stock frame and made concentric with the tool stock or spindle. A spring, *q*, serves to press down the hand-lever T and to retain the tooth *o* in engagement with teeth of the plate or arm U, thereby preventing the collar S from rotating and allowing the friction-wheels to separate, as they would otherwise do. The parts being thus constructed, motion is transmitted from pulley D of counter-shaft A by belt E to pulley R, and through friction wheels or gears P Q to the tool stock or spindle and the tool carried thereby, the rear leaf or side of the belt passing behind and beneath a guide-pulley, *r*, on frame I, thence forward beneath pulley R, up around the front of said pulley and over the top thereof to the under side of a pulley, *s*, carried by frame I upward behind said pulley in front of a third pulley, *t*, carried by said frame I, and thence directly back to belt-pulley D of counter-shaft A.

Upon referring to Fig. 4 it will be seen that the joint distance of the axles of pulleys *r* and *s* from the stud or neck *c*, on which frame I is pivoted, is just about equal to the distance of the axle of the wheel *t* from said stud; and as said frame and the rod J, which carries the tool-stock frame, are rigidly connected, it follows that when the latter frame is raised the pulleys *r* and *s* will tend to tighten the belt E, but that at the same time the pulley *t* will move back from the belt, and thus compensate for the increase of tension due to the action of the pulleys *r* and *s*. On the other hand, when the tool-stock frame is lowered, the belt E is straightened and slackened where it passes pulleys *r s*; but such slackening is compensated for by the forward movement of pulley *t* and its pressure upon the belt E. This compensation is very perfect, and enables me to use a single driving-belt where before two were required. This not only simplifies and cheapens the manufacture of the apparatus, but increases its efficiency and certainty of action.

The tool-stock, its frame, and the rod J are counterbalanced by a weight, V, attached to one end of a cord or band, W, which passes over a pulley, X, and is attached at its other end to an eye or ring projecting from the upper side of sleeve K, as in my former patent.

From the foregoing description it will be seen that the tool-stock can be raised or lowered or swung in a horizontal plane, tipped or turned to any angle about the axis of cross-arm L, or in a plane at right angles to said shaft, the sleeve K in the latter case rotating upon or about rod J, and that any two or more of these adjustments may be combined. In this way the tool may be carried wherever required and made to work in any direction. The weight V not only balances the tool-stock and its frame, but also returns them to their normal position after they are tipped or swung laterally.

If it be desired to reverse the direction of the tool stock or spindle, as required—for instance, in turning out or withdrawing a large number of screws—the belt will be crossed at a point below the pulley R and the pulleys *r s*.

When the tool-stock is moved about in a horizontal plane or about spindle *a* as a center, the belt E will merely twist slightly between the pulley D and the pulleys *r* and *s*.

Pulley C′ is merely an idler or loose pulley, to which the driving-belt is shifted when it is not desired to drive shaft A.

The belt E may be tightened, when necessary, by setting the collar J′ farther from the pivot of frame I, and thereby forcing outward the sleeve K and belt-pulley R, the collar being secured at whatever point desired by means of a set-screw or like device.

It is obvious that the collar S may be made to bear against a shoulder formed on the tool stock or spindle itself, instead of against the hub of wheel or gear P, which latter constitutes a shoulder. So, too, a wedge may be arranged to act upon and lift the wheel or gear P without encircling the spindle.

It is of course obvious that the wheels P Q may be either friction or toothed gears, though friction-gears are preferred. The two forms are, however, the commonly-recognized equivalents of each other, and to substitute one for the other would involve no departure from my invention.

Having thus described my invention, what I claim as new, and desire to secure by Letters Patent, is—

1. The herein-described apparatus for boring, drilling, &c., consisting of shaft A, pulley D, carried by said shaft, rod G, suspended from said shaft, block H, swiveled to said rod, frame I, pivoted to block H, rod J, attached to and extending from said frame, collar J′, sleeve K, encircling said rod and formed with yoke K′, frame M, suspended in said yoke, friction-wheel Q and band-wheel R, carried by said frame, tool stock or spindle N, swiveled in frame M, spring case or shell *j*, spring *l*, placed within shell *j* and bearing upon the tool stock or spindle, friction-wheel P, secured upon said tool stock or spindle, pulleys *r s t*, carried by frame I, and belt E, passing around pulleys D, *r*, *s*, *t*, and R, all substantially as described and shown.

2. In a boring and drilling apparatus, the combination, with a suspending-rod, of a tool holder or stock and a supporting-frame therefor swiveled to the suspending-rod and adapted to swing or move in a horizontal plane.

3. In a device for boring, drilling, &c., the combination of a shaft, a yoke loosely hung upon said shaft, a rod extending downward from said yoke, a block swiveled to the rod, a tool-stock, and a supporting-frame for said tool-stock connected to said block by a horizontal pivot, whereby the tool-stock and its supporting-frame are enabled to move both vertically and horizontally in relation to the vertical rod.

4. The combination, substantially as set forth, of suspending-rod G, a frame, I, connected therewith by a horizontal pivot and provided with pulleys *r s t*, rod J, projecting from frame I, a tool-stock and supporting-frame carried by said rod, and a belt passing over pulleys *r s t* and the driving wheels or gears of the tool-stock, substantially as described and shown, whereby the rollers *r s t* are caused to maintain a uniform tension of the driving-belt under varying adjustments of the tool-stock.

5. In combination with a supporting-frame, cross-arm L, wheel or gear Q, tool stock or spindle N, wheel or gear P, carried thereby, spring *l*, bearing upon said spindle and tending to hold the wheels or gears apart, and collar S, provided with inclines *n*, to bear against the supporting-frame of the tool stock or spindle, and with a plane face to bear against a shoulder of the wheel or gear P.

6. In combination with spindle or tool-stock N, provided with pulley P, a pulley, Q, for imparting motion to the pulley P, and a collar or block having an inclined face and bearing at one side against pulley P and at the other side against a fixed support, whereby movement of the collar is caused to throw the pulleys P Q into or out of contact.

7. In combination with shaft A, suspending-rod G, rod J, pivotally connected with rod G, tool stock or spindle N and driving-gearing therefor supported by rod J, driving-belt E, passing about and from a wheel or gear on shaft A to and about a belt wheel or gear of the driving-gear of the tool-stock, a frame, I, connected and movable with rod J, and wheels or gears *r s t*, carried by said frame I and serving to guide the belt and to maintain even tension thereon.

8. In combination with shaft A, yoke B, suspended therefrom, rod G, extending downward from said yoke, block H, swiveled to rod G, frame I, pivotally attached to block H, rod J, rigidly attached to frame I, collar J′, and tubular rod K, encircling rod J, tool-stock frame M, provided with cross-arm L and carried by rod K, tool stock or spindle N, carried by frame M, friction-gears P Q, belt-pulleys R and D, carried by cross arm L and shaft A, respectively, guide-pulleys *r s t*, carried by frame I, and belt E, passing over pulleys D, *r*, *s*, *t*, and R, all substantially as shown and described.

9. In combination with drill stock or spindle N and driving-gears P Q, a spring bearing upon said spindle and tending to separate the gears, and a cam or wedge acting in opposition to the spring and serving to press the pulleys together.

10. In combination with frame M, provided with cross-arm L and having incline *m*, drill stock or spindle N, mounted in said frame wheel or gear P, secured thereon, wheel or gear Q, carried by cross-arm L, and collar S, encircling the tool stock or spindle below wheel or gear P, and having incline *n*, to bear upon the incline *m*, substantially as and for the purpose specified.

11. In combination with frame M, formed with cross-arm L, and having toothed arm U, shell *j*, and incline *m*, spindle N, provided with wheel or gear P, wheel or gear Q, carried by cross-arm L, a spring, *l*, serving to keep the gears P Q separated, and collar S, encircling the spindle and provided with handle or lever T and with tooth *o*, to engage with the teeth of arm U.

12. In combination with a carrying-frame, M, having cross-arm L, shell *j*, toothed arm U, and incline *m*, spindle N, provided with wheel or gear P, wheel or gear Q, carried by cross-arm L, a spring, *l*, serving to keep the gears P Q separated, collar S, encircling the spindle and provided with incline *n*, lever T, pivoted to collar S and provided with tooth *o*, to engage with arm U, and spring *q*, bearing upon said lever and serving to hold it in engagement with arm U.

In witness whereof I hereunto set my hand in the presence of two witnesses.

MICAJAH C. HENLEY.

Witnesses:

WEB PARRY,

WILLIAM E. BELL.